(12) United States Patent
Cheng (10) Patent No.: US 8,225,204 B2
(45) Date of Patent: Jul. 17, 2012

(54) SYSTEM AND METHOD OF DOCUMENT REUSE

(76) Inventor: Kai Kei Cheng, Kennedy (HK)

( * ) Notice: Subject to any disclaimer, the term of this patent is extended or adjusted under 35 U.S.C. 154(b) by 299 days.

(21) Appl. No.: 12/410,737

(22) Filed: Mar. 25, 2009

(65) Prior Publication Data
US 2009/0249180 A1    Oct. 1, 2009

Related U.S. Application Data

(60) Provisional application No. 61/039,807, filed on Mar. 27, 2008.

(51) Int. Cl.
*G06F 17/24*    (2006.01)
(52) U.S. Cl. ........ 715/256; 715/206; 715/781; 715/765; 715/804
(58) Field of Classification Search .................. 715/206, 715/255, 256, 765, 781, 804
See application file for complete search history.

(56) References Cited

U.S. PATENT DOCUMENTS

| | | | |
|---|---|---|---|
| 5,222,236 A | 6/1993 | Potash et al. | |
| 5,655,130 A * | 8/1997 | Dodge et al. | 715/210 |
| 6,065,026 A | 5/2000 | Cornelia et al. | |
| 6,895,554 B2 | 5/2005 | Endress et al. | |
| 2003/0149940 A1 | 8/2003 | Fordyce et al. | |
| 2006/0195454 A1 | 8/2006 | Davis et al. | |
| 2007/0011608 A1 | 1/2007 | Titemore et al. | |

FOREIGN PATENT DOCUMENTS

| | | |
|---|---|---|
| CN | 1555527 A | 12/2004 |
| WO | 03075191 A1 | 9/2003 |
| WO | 2005052725 A2 | 6/2005 |

OTHER PUBLICATIONS

Greg Perry, "Sams Teach Yourself Microsoft® Office 2007 All in One", Pub. Date: Nov. 10, 2006, pp. 34, 39-40 43, 49, 95, 104, 106, 144, 382, 564-569, 583.*

"Word 2007: The Missing Manual," by Chris Glover, Published by O'Reilly Media, Inc., Dec. 21, 2006.*

* cited by examiner

*Primary Examiner* — Doug Hutton, Jr.
*Assistant Examiner* — Brian A Garmon
(74) *Attorney, Agent, or Firm* — The Webb Law Firm, PC (57) ABSTRACT

The present invention is a system and method for computer optimization of content and reusing documents. The invention provides integrated user interfaces to facilitate reuse of static or dynamic content. The system further includes on a display, a first window and a second window where the system includes programming instructions operable to control the processing unit to output to the first window the content of memory. The content output to the first window is simultaneous to output being displayed in the second window of the separate program. Each of these programs may reside in the same memory space or different memory space. The separate program can provide documents or content to be used in the first window. The system further includes programming instructions operable to transform selections retrieved from documents of the second window into content for the first window.

23 Claims, 9 Drawing Sheets

SYSTEM AND METHOD OF DOCUMENT REUSE

CROSS REFERENCE TO RELATED APPLICATIONS

This application claims priority to U.S. Provisional Application No. 61/039,807, filed on Mar. 27, 2008, which is herein incorporated by reference in its entirety.

BACKGROUND OF THE INVENTION

1. Field of the Invention

The present invention relates generally to a system and method for document assembly and, more specifically, to a computer reuse system for optimizing text and content.

2. Description of Related Art

The present invention is intended to overcome problems that professionals have manually creating new documents or overwriting documents to make them relevant to their present situation. Some existing solutions for the reuse of documents allow users to utilize templates wherein stored documents are subdivided into defined sections which can be reused in new documents having similar sections. Still, other existing solutions allow users to create documents based on querying a database containing stored documents and reusing the results of the query in the new documents.

Several disadvantages of the existing solutions are readily apparent. First, reasonable content is not well organized and for this reason it is very difficult to reuse. Frequently, existing files are stored in different directories and can take a long time to find and gather when puffing together documents. In addition, the relevant data is not always stored in the proper locations. Further, content updates must be manually entered throughout the entire document and any other related fields, often times causing errors. In addition, overwriting all documents could possibly produce unwanted codes and metadata that cause bugs, errors, and conflicts.

SUMMARY OF THE INVENTION

The present invention is a system and method for computer optimization of content and reusing documents. The invention includes a system having a processing unit, memory coupled to the processing unit, and programming instructions. The system further includes content stored on the memory which comprises a library and a project. The library includes folders, items, and definitions. The project comprises dynamic data, project definitions, and documents. The system further includes a display adapted to output the content of the memory. An input device is included, which can be operable to select text in a document, where the processing unit can respond to the input device operations and is controlled by programming instructions operable to create content based on the text in the documents. The input device selects the content and the processing unit, which is controlled by programming instructions, is operable to update documents of the project in memory. The system further includes on a display, a first window and a second window where the system includes programming instructions operable to control the processing unit to output to the first window the content of memory. The content output to the first window is simultaneous to output being displayed in the second window of the separate program. Each of these programs may reside in the same memory space or different memory space. The separate program can provide documents or content to be used in the first window. The system further includes programming instructions operable to transform selections retrieved from documents of the second window into content for the first window. The input device is adapted to control the processing unit to store the content in memory. The system further includes programming instructions operable to transform content from the first window into content of the second window where the transformation comprises storing a bookmark in memory where the bookmark determines a location of the dynamic data which is linked into a document.

One object of the present invention is to provide integrated user interfaces to reuse static or dynamic data. When the system includes dynamic data, it further includes programming instructions operable to control the processor to update dynamic data in a second window in response to the dynamic data being updated in the first window. One or more occurrences of the dynamic data in the displayed document or any document in an opened project in the system can be updated. A bookmark is stored in memory and can comprise a unique ID which determines the location of the dynamic data linked into the document. A document can comprise multiple occurrences of bookmarks. A document can also comprise multiple unique bookmarks wherein each unique bookmark identifies specific data content. The system can include an application of a text editor and a browser or e-mail in either the first or second window. Programming instructions are included operable to provide a switch in the first window adaptive to control the processing unit to send to display unit output which includes either dynamic data or a content library tree. A content library tree can have folders, either one or more. Each folder can have one or more items associated to the folder. Folders can also have folders within folders and all of the information about the folders and items are stored in definition files. The system includes programming instructions operable to add, edit, remove, and rename folders and items. Programming instructions are further operable to output a window display content library tree and display properties of the content library tree.

The system also includes programming instructions operable to provide an output window displaying a project and a window to display properties of the project. The system further includes an output window providing a display of the dynamic data stored in memory and a window showing properties of the dynamic data along with an additional window showing the contents of the dynamic data.

The invention also includes a method for reusing data comprising the steps of providing a reuse system, outputting content on a display, selecting content with an input device, and responding to the input device. The step of providing a reuse system comprises providing a processing unit, memory, and programming instructions, and content stored on said memory. The content comprises a library and project. The library includes folders, items, and definitions. The project comprises dynamic data, project definitions, and documents. When the output is displayed, the display units show the contents of the memory. The selection by the input device can be in a text of a displayed document. The response to the input device by the processing unit creates content based on the text in the documents, where the input device is used to select the content and the processing unit is controlled to update the documents and the project stored in memory. The method of the present invention can further create a project and update the project by adding documents to the project. The step of providing an output window can further include showing multiple subwindows and providing a reuse window in the first subwindow and a document window in a second subwindow. The method further includes providing a document view, a content library properties view, and a dynamic data view or project view. Each of these views can be in an integrated window or separate windows controllable and selectable by the input device. The method can further include the step of showing a content library editor or a dynamic data editor operable to edit content stored in memory.

DESCRIPTION OF THE PREFERRED INVENTION

The present invention provides a computer reuse system for optimizing content. The system can integrate content to edit and create new documents. The system can integrate with other programs, including word processing, spreadsheets, presentation documents, browsers, databases, and e-mail applications.

Figure 1:
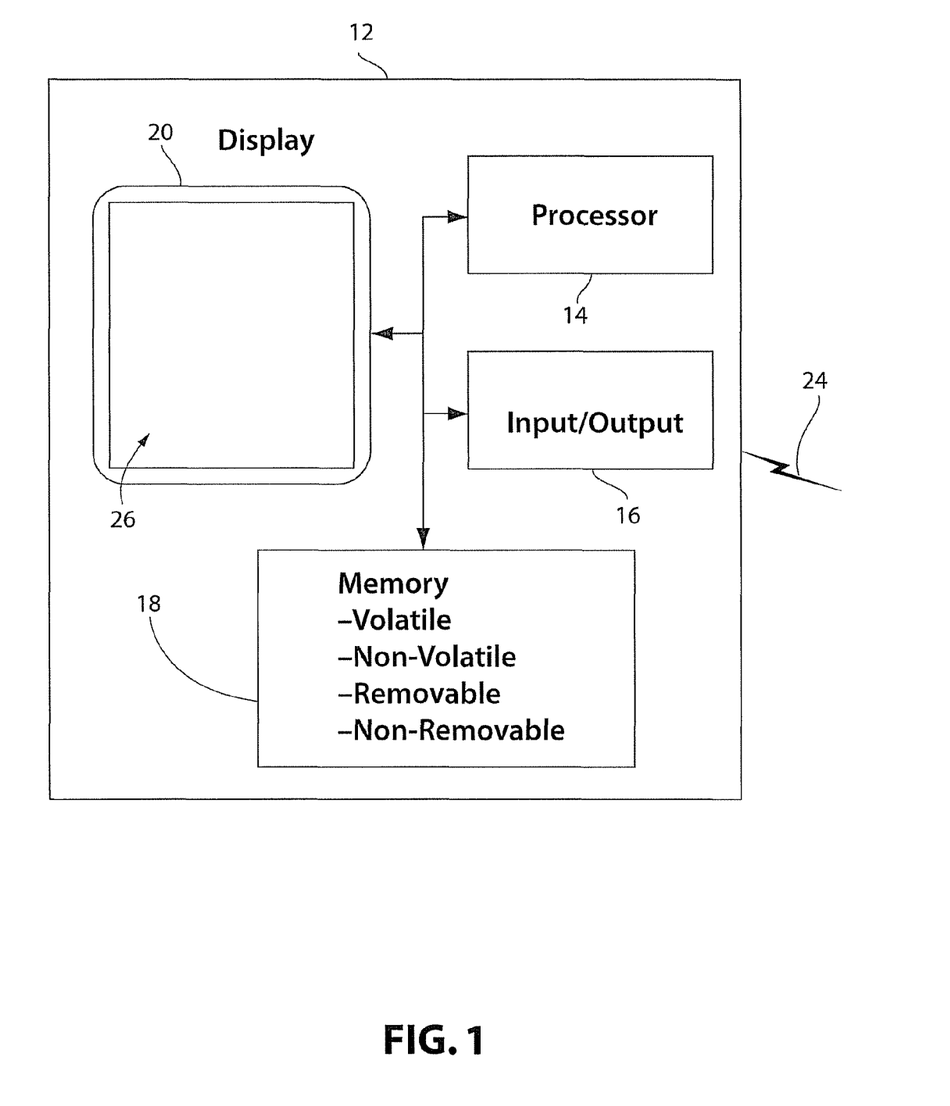
FIG. 1 is a diagram of an exemplary computing device for implementing a document overview.

With reference to FIG. 1, a diagram of an exemplary computing device 12 for implementing a document assembly integrated window 26 is shown. In a basic configuration, computing device 12 comprises a processing portion 14, a memory 18, and a display portion 20. Depending upon the exact configuration and type of computing device 12, memory 18 can be volatile (such as RAM), non-volatile (such as ROM, flash memory, etc.), or some combination thereof. Computing device 12 also can include additional features/functionality. For example, computing device 12 also can include additional storage (removable and/or non-removable) including, but not limited to, magnetic or optical disks or tapes. Such additional storage is illustrated in FIG. 1 as part of memory portion 18. Computer storage media includes volatile and non-volatile, removable and non-removable media implemented in any method or technology for storage of information such as computer readable instructions, data structures, program modules, or other data. Memory 18 and any portion thereof, such as removable storage and non-removable storage, can be implemented utilizing computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 12. Any such computer storage media can be part of computing device 12.

Computing device 12 also can comprise an input/output portion 16 containing communications connection(s) that allow the computing device 12 to communicate with other devices and/or networks via an interface 24. Interface 24 can comprise a wireless interface, a hard-wired interface, or a combination thereof. Input/output portion 16 also can comprise and/or utilize communication media. Communication media typically embodies computer readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limiting, communication media includes wired media, such as a wired network or direct-wired connection, and wireless media, such as acoustic, RF, infrared, and other wireless media. The term computer readable media as used herein includes both storage media and communication media. Input/output portion 16 also can comprise and/or utilize an input device(s) such as a keyboard, a mouse, a pen, a voice input device, a touch input device, or the like, for example. An output device(s) such as a display, speakers, printer, or the like, for example, also can be included.

Display portion 20 comprises a portion 26 for rendering an integrated window, or a portion thereof.

The memory 18 can include memory to store content. The content can be in the form of static or dynamic content. Static content can include text, tables, graphics, objects, or any other content known in the art. Static content is defined as content that can be compiled into documents directly with little or no modification. Dynamic content can also be included in memory 18. Dynamic content can be content reusable and updatable across a broad range incorporating one or many documents. Additionally, the memory 18 can store folders, items, and definitions. The folders stored in memory 18 can be containers of library content. The library content includes items and definitions used in a particular library. The definitions govern the overall library structure and store the properties of each item including name, size, type, date created, and any relevant property. The items can have a relationship to their folder and each other item in the folder. For example, a folder could be called introduction, and thereafter, the user of the reuse system could include letter introductions only in this folder. The library therefore defines a container having items that are at least related back to the container and can also relate to other items in the folder. The content library can then display content logically in a reuse window.

Item definitions describe the item, the definition stores the name, type, size, date created, date modified comments, as well as an ID and references.

Figure 2:
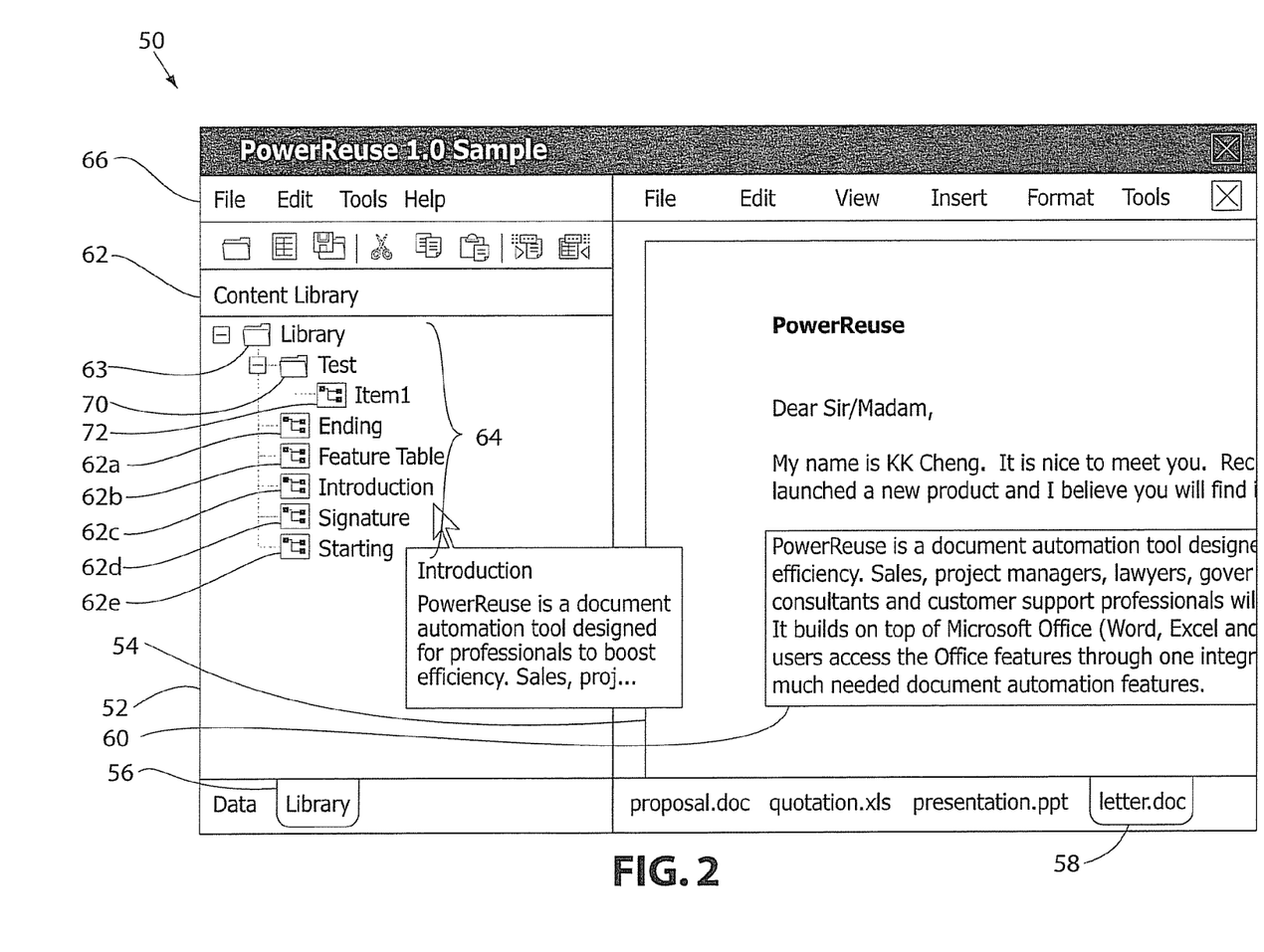
FIG. 2 is a depiction of integrated windows having content library windows displayed therein.

With reference to FIG. 2, a display is shown having a first window, defined as an integrated window 50, a second window, defined as a reuse window 52, and a third window, defined as a processor window 54. The integrated window 50 can be used to create static content. The reuse window 52 can display a content library 62 having structure comprising those items previously stored in memory 18. As shown in FIG. 2, a library function tab 56 for the reuse window 52 can be selected while the display content library 62 is displayed in the reuse window 52 when library tab 56 is selected. The content library 62 is a library of selectable content for reuse in a document. The content library 62 is a display of the content stored in memory 18. The content library 62 is a group of content that includes items 62a-e which are members of the group. Items are created and defined to include content occurrences. Item 62a is defined as ending content; item 62b is defined as feature table content; item 62c is defined as introduction content; item 62d is defined as signature content; and item 62e is defined as starting content. In memory 18, each of these items 62*a-e* comprises content and also includes a respective definition file (not shown) that relates properties of them to the content. An input device, such as a mouse, pointer, or keyboard, can be utilized to drag and drop and the items 62*a-e* from the reuse window 52 into the processing window 54. The type of input device is meant to be non-limiting. When a user moves an item 62*a-e* into the processing window 54, it becomes integrated with the content displayed in the processing window 54. After completion, the processing window 54 contains the item 62*a-e* moved. For example, the selection 60 contains introduction text that was moved there when item 62*c* was moved to the processing window 54.

Content library 62 can store, as content, any type of editable content such as texts, images, or e-mail files. As shown in FIG. 2, the integrated window 50 includes a file menu 66. The file menu 66 can provide the user with further options to create new projects, open existing projects, and add files to projects. The integrated window 50 further provides the option to move content from the first window 52 to the second window 54 or the other way around and create content in content library 62. In operation, the user can select any text from processing window 54 and move it into the root 63 of content library 62 of reuse window 52. When text is moved into the content library 62, the computer reuse system creates a container item in memory, 70 labeled test, and places content item therein. In memory, properties are stored in the definition file of item 72 associated to a file containing content and located into a folder of a file system for content library 62 in order for the library 62 to include the new item. The user can rename the item after it has been created. The user could also create an item through the file menu 66 using a menu item labeled create (not shown). In the folder created for content library, a library definition file is located, which tells the system each item the content library 62 includes.

In order to create content in the content library 62, the library function tab 56 must be selected. To create dynamic data, the library tab 56 must be switched to data.

Figure 3:
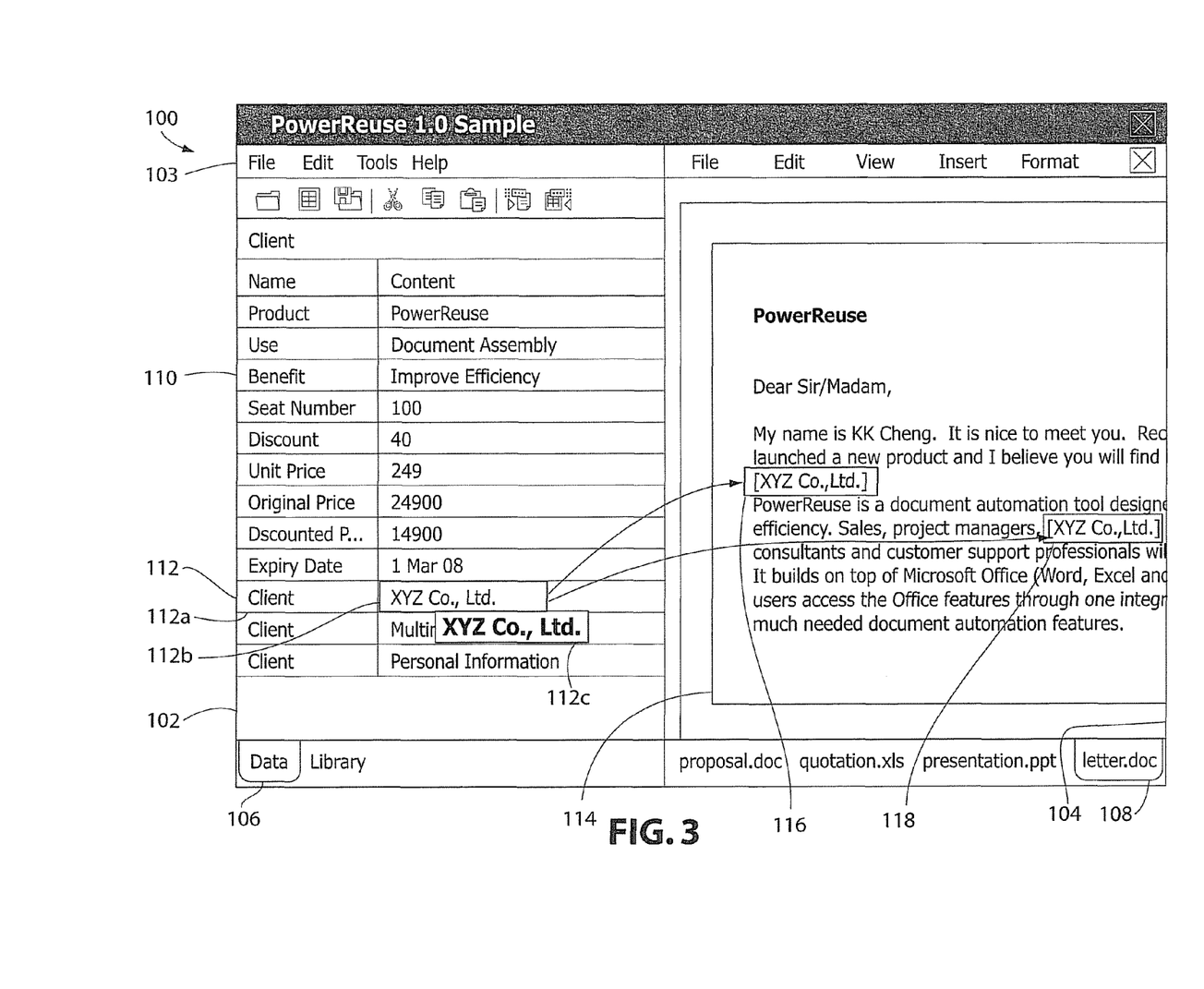
FIG. 3 is a depiction of integrated windows having data field windows displayed therein.

With reference to FIG. 3, an integrated window 100 includes a first window defining a reuse window 102, and a second window defining a document editor window 104. The reuse window 102 is in dynamic data mode as the data tab 106 has been selected. The reuse window 102 contains data fields 110 that can be reused in documents. Office tab 108 can include open documents which are included in a project. The projects, in addition to storing documents, also store the dynamic data. Dynamic data is categorized and memory can include multiple categories. Each data field 110 includes a name value data set. For example, as shown in FIG. 3, the data fields 112 include a name field 112*a*, a value field 112*b*, and content detail pop-up 112*c*. The field 112*a* therefore includes a name, client, defining content 112*c*, XYZ Company, Ltd., as shown in content detail pop-up 112*c*. This content is stored in memory 18 and is displayed in the output 16. The data field 112*a* can be dragged into the document editor window 104. When the data field 112*a* is dragged into the document editor window 104, the content is placed into the document 114 therein. When an update is made to the fields 116 and 118 included in the document editor window 104, as shown in FIG. 3, the content in the document editor window 104 will change because the data field 112 value is changed. Therefore, changing the content of 112*b* of field 112 will propagate the change to fields 116 and 118 stored in a document and additionally anywhere else the field is contained in the document. In addition, when more than one document is contained in a project, each document can include field 112. When the change is made to 112, each document can be updated at the same time to reflect the change to item 112. The user also has the option to only update one field when they change the value for 112*b*. A pop-up box (not shown) gives the user an option to either update all fields or only one field in addition to giving a search routine for searching the document for instances of the dynamic data.

Figure 4:
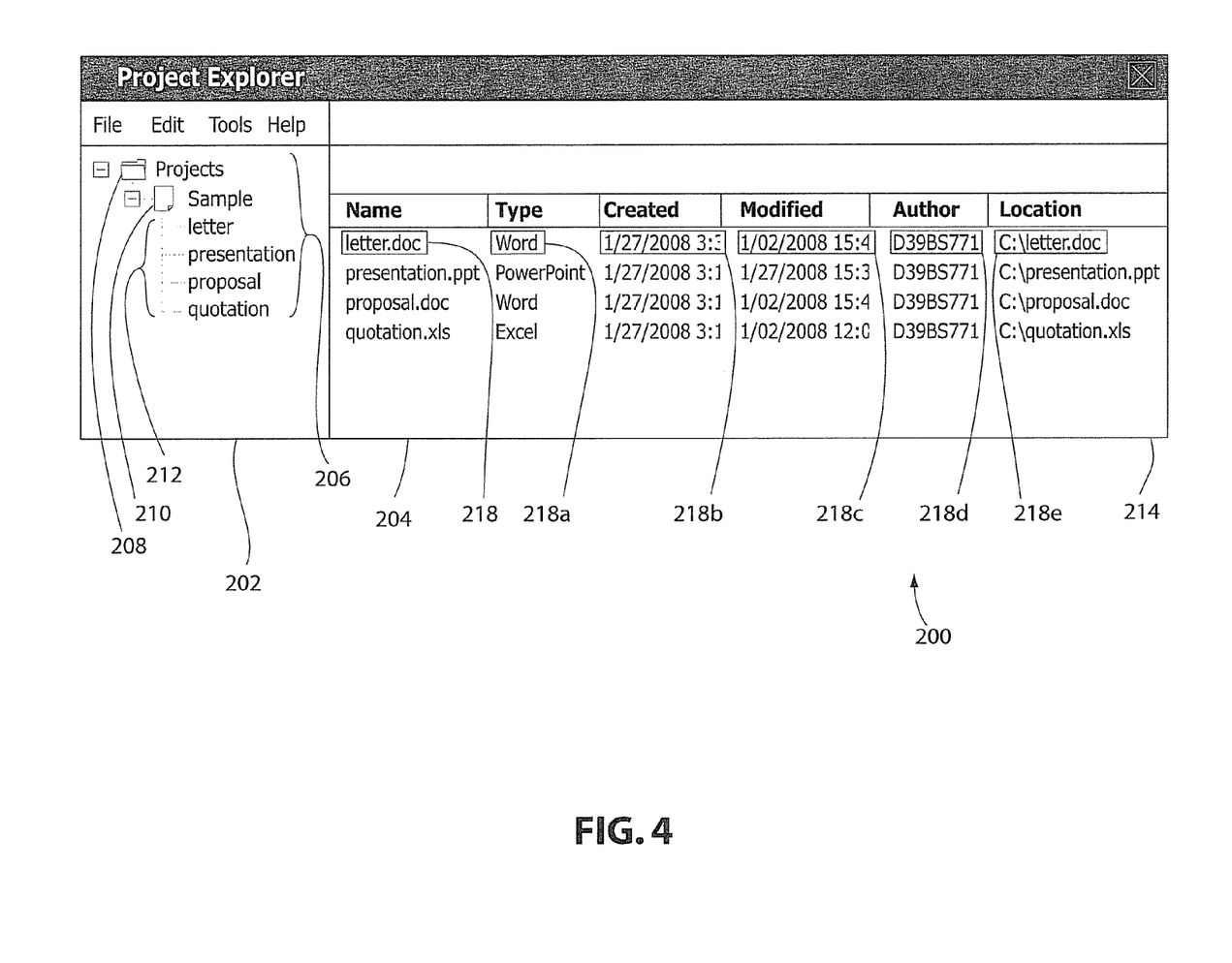
FIG. 4 is a depiction of a project explorer having a project tree and file details displayed therein.

The project explorer 200 includes a first window defined as a reuse window 202 and a second window defined as a document window 204. Project window 200 enables the creation of projects as well as the addition, deletion, and management of projects. The reuse window 202 contains a project tree 206 having a root folder 208 defining content in the form of documents in the project. The root folder 208 defines subfolders 210 as well as children of subfolders 212. As shown in FIG. 4, the project explorer 200 can organize documents using a project tree 206 which is defined by a project definition file in memory 18. Project tree 206 can include relationships of subfolders and documents within the subfolders 210. The project tree 206, as shown in FIG. 4, contains four documents 212 that are defined in the project for the subfolder 210. In document window 204 of project explorer 200, a detailed description of document details 214 of the documents 212 is shown. Document details 214 display name 218, a type 218*a*, a date created 218*b*, a date modified 218*c*, an author 218*d*, and a location 218*e*. When new dynamic data is created in a project of subfolders 210 in a form of data fields 110 as discussed in the previous reference to FIG. 3, the documents 212 that belong to that project are updated globally. Each document that is a member of the project is searched in the data field and updated. A user can be prompted to decide if the specific field should be updated. Dynamic data is only updated into documents within a project and not outside of the project.

Figure 5:
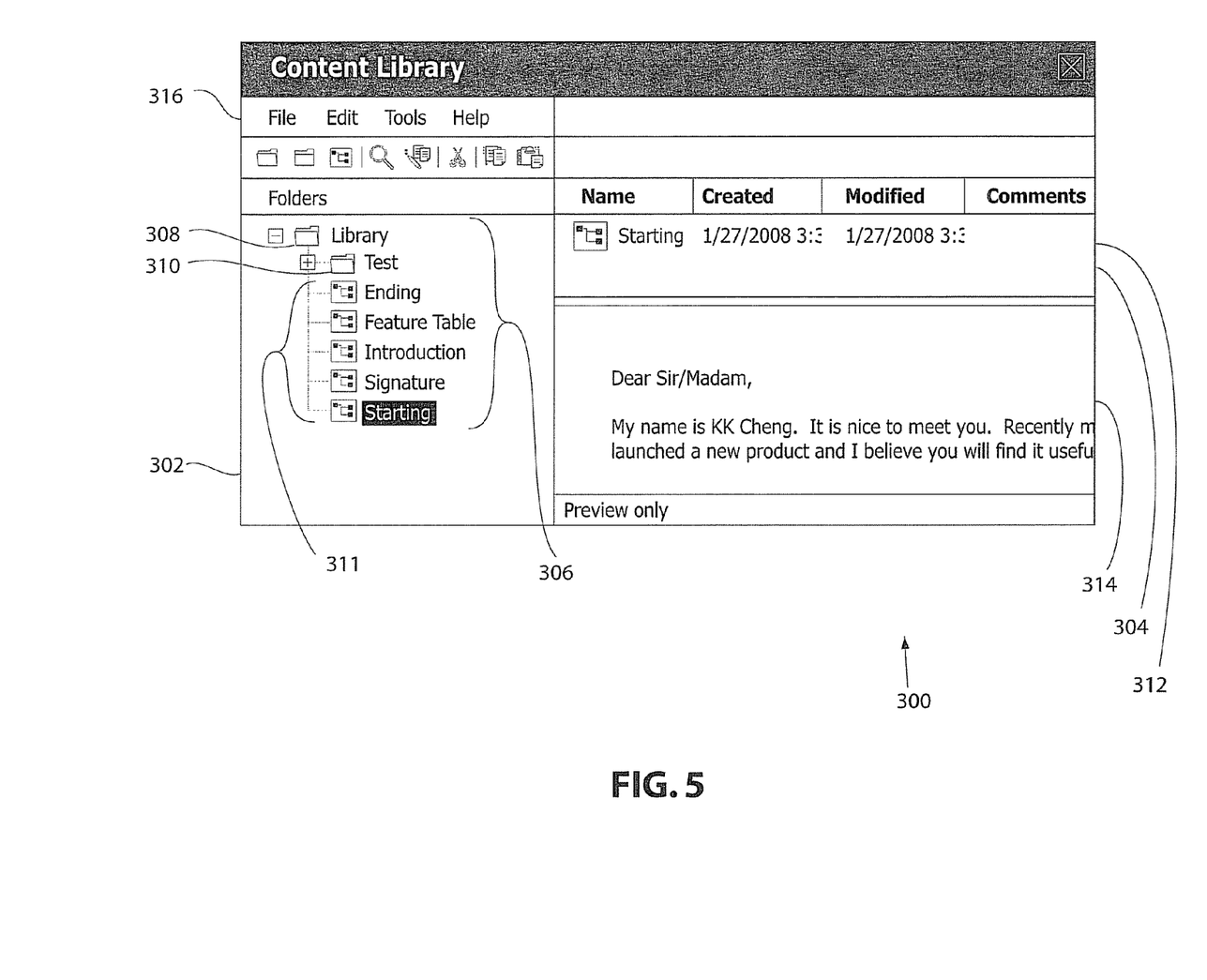
FIG. 5 is a depiction of a content library having a library tree, items, and content preview displayed therein.

With reference to FIG. 5, the content library display 300 includes a first window as defined as a reuse window 302 and a second window defined as an item detail window 304. The reuse window 302 can include a library tree 308 defined by the definition file and stored in memory 18. Library tree 308 includes items 311 corresponding to items 312 shown in the item detail window 304. Selecting one of items 311 will cause the display in content preview 314 of the selected item 311. Items 312 are displayed in content preview 314, are editable, and can be stored. To change item name, an editor (now shown) can display the entry of the item name and author name as well as the edited defined ID which is associated to the item name. Once the item is saved, it is displayed in its corresponding subfolder 310 of library tree 306 as defined in the definition file. New folders can be added to the library tree 306 by using the file menu 316. In addition, a folder can be added by defining new items in a template or dragging or moving a selection into the folder.

Figure 6:
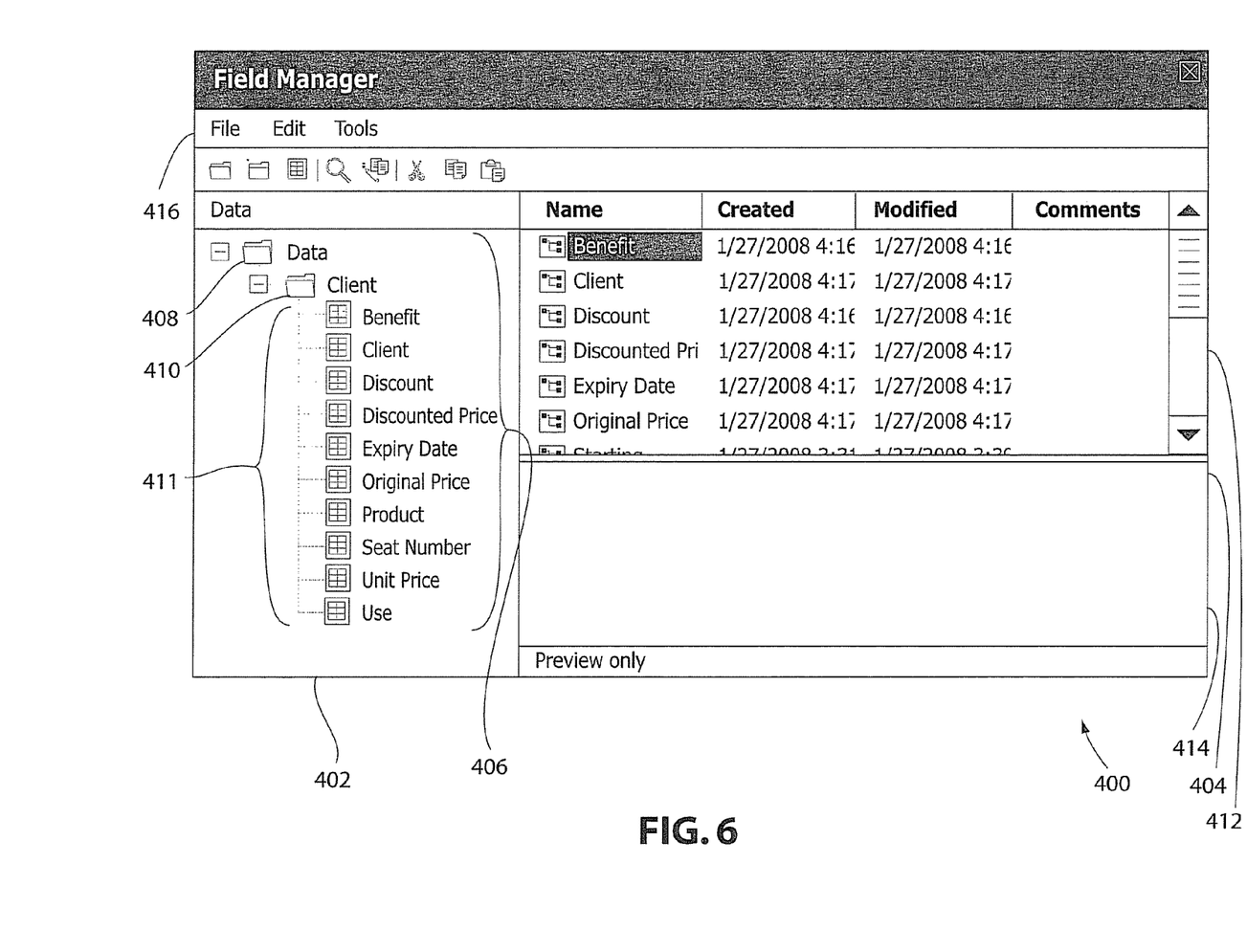
FIG. 6 is a depiction of a field manager having a field tree, fields, details, and field preview displayed therein.

With reference to FIG. 6, a field manager 400 is shown having a first window defined as a reuse window 402, a second window defined as a field detail 404, and a third window defined as a field preview window 414. The field manager 400 can define dynamic data. The reuse window 402 displays dynamic data 408 including subfolders 410 of a field tree 406. Subfolders 410 define data fields 411. Each field 411 is shown in fields detail window 404. The fields 412 are selected in the reuse window 402 and can be displayed in the field preview window 414. The selected fields 412 can be edited by changing content in the editor when the field 412 is selected. New fields can be added to the field tree 406 of field manager 400 by selecting the desired subfolder 410 in the field tree 406, then selecting new items from the file menu 416. The item name, author, date period, date modified, and comments can be associated to the new item. A pop-up window (not shown) can be used to input the information. Additionally, content can be stored, moved, and removed. Once the user has saved an item 411, it can be displayed in the associated subfolder with the name displayed in the field tree 406. If the entry is edited, the dynamic data is updated across the project as well.

Figure 7:
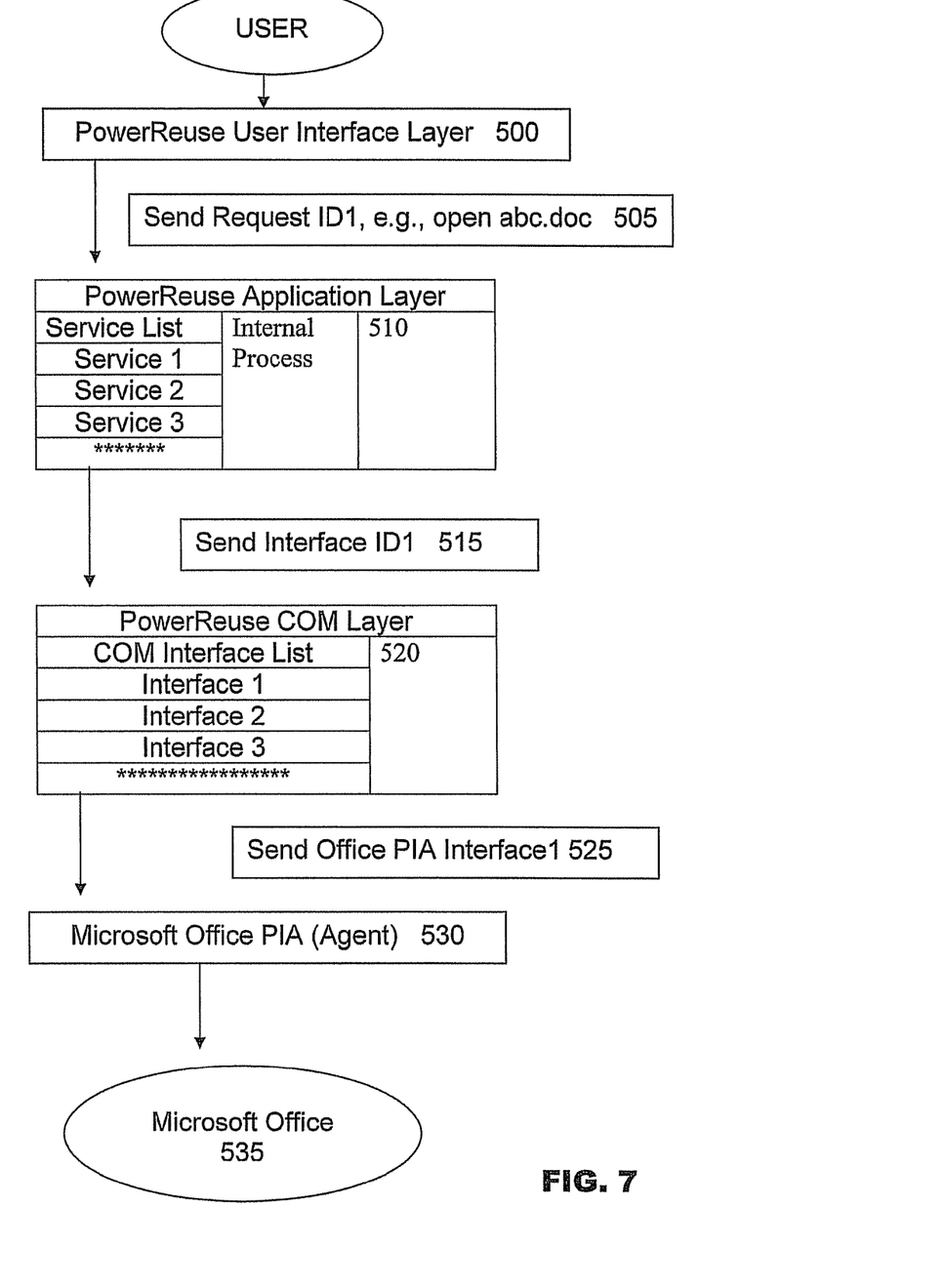
FIG. 7 is a flow chart showing reuse interface.

The present invention utilizes a container to define applications. The container is a custom control. With reference to FIG. 7, in a preferred embodiment, the process steps to interface an application, namely, MICROSOFT OFFICE™, are shown. However, other applications can be interfaced in a similar way to create a reuse window, including browsers, e-mail, editors, and other graphical user interfaces. First, a user requests a job through PowerReuse interface layer 500. For example, the user selects file from the file menu 66 of FIG. 2 and then selects open (not shown) from the file menu 66. The interface layer 500 sends an opening request 505 to the application layer 510. The request includes an ID 505, for example, ID1.

Request ID1 matches a service, service 1, in the application layer 510. An internal process is executed to provide the necessary data for the PowerReuse's COM layer 520. PowerReuse application layer 510 sends interface ID1 515 with data to the COM layer 520. The COM layer 520 sends MICROSOFT OFFICE™ PIA interface ID1 525 to MICROSOFT OFFICE™ PIA 530, which is an agent provided by MICROSOFT OFFICE™ 535 to interface with MICROSOFT OFFICE™.

When MICROSOFT OFFICE™ 535 receives a request from PIA 530, it processes the requests and generates the result. Pass or fail signals can then be sent back to PIA 530 and back to the interface layer 500 through the original route described previously. The use of MICROSOFT OFFICE™ is for description purposes only as the editor is not meant to be limiting and any editor known in the art can be used.

Figure 8:
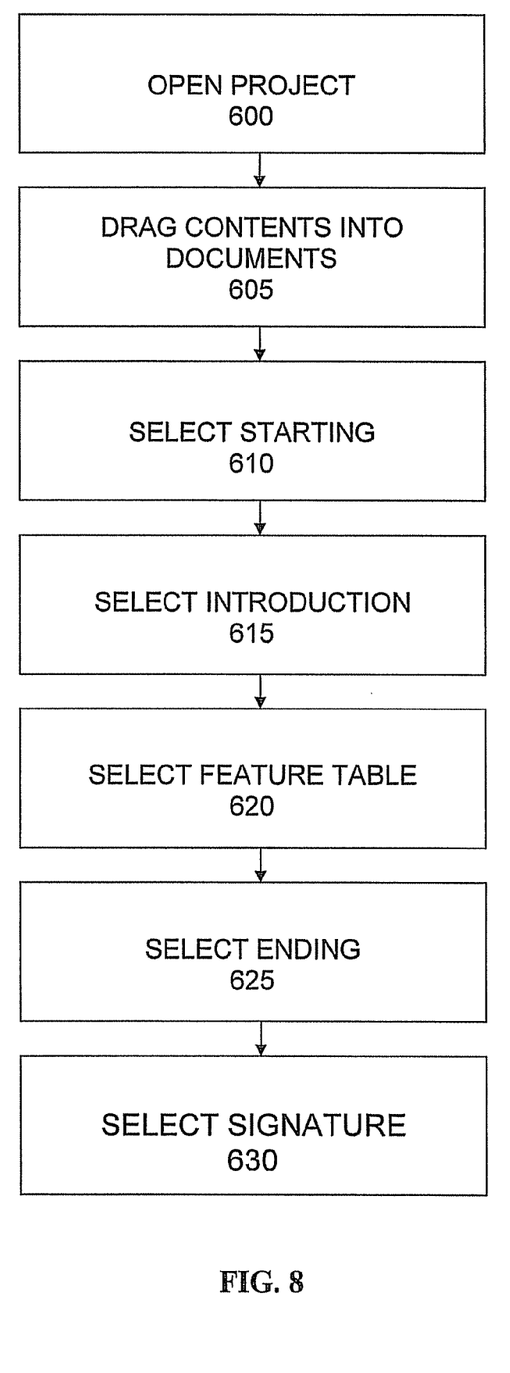
FIG. 8 is a flow chart showing creating a project.

With reference to FIG. 8, a method of reusing a document is described. Using the system of the present invention as previously described, the document library can be built to facilitate the reuse of documents and the optimization. In the first step, a project is opened and defined at step 600. Next, documents are added to the project and the contents of the documents are stored within the project. At step 605, the user can drag contents of the documents into a content library or likewise may custom create folders and items in the content library, or dynamic data in the field editor which can then be reused in the documents by dragging documents from window to window or using the menus. At step 610, the user is starting to use the project along with an open application. At step 615, an introduction is selected from the content library and moved into the current document. At step 620, a feature table is used to create data in the open document. The ending is then selected from the content library and moved into the document. Lastly, a signature is placed in the document.

Figure 9:
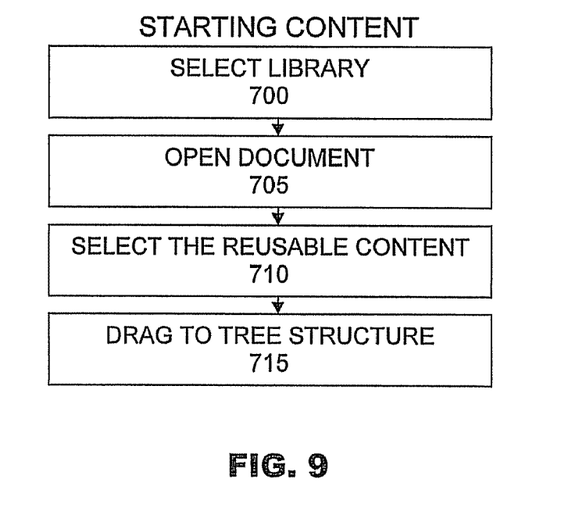
FIG. 9 is a flow chart showing creating content.

With reference to FIG. 9, the method steps are shown for creating content. In step 700, a library is opened and selected. In step 705, a document is opened. In step 710, reusable content is selected from the library tree. In step 715, the reusable content is moved from the tree structure to the document where it is dropped into the document and becomes a piece of the document.

Figure 10:
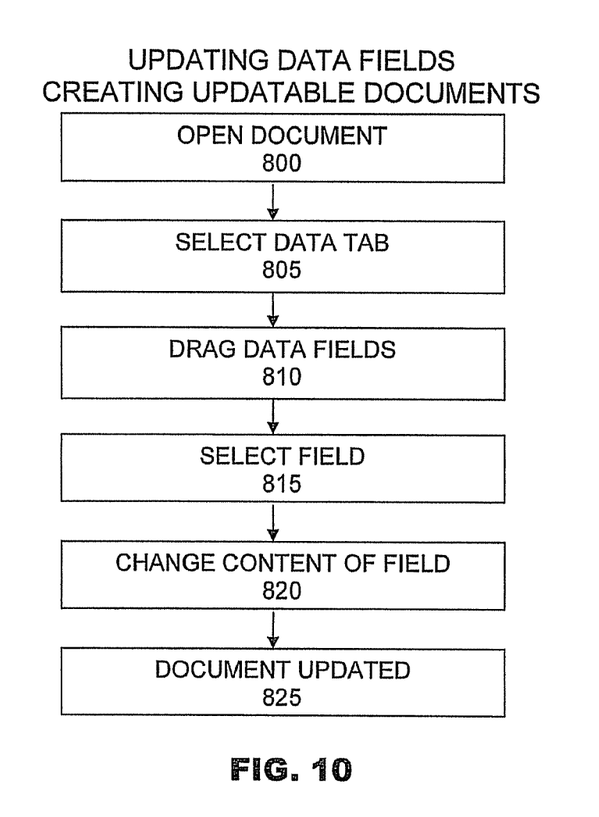
FIG. 10 is a flow chart showing updating dynamic data.

With reference to FIG. 10, the method steps to create and update dynamic data in a document are shown. Opening the document at step 800 allows the user to add content by selecting the data tab at step 805 and dragging data fields at step 810 into the open document. To update content inside a document, select a field step 815. The data fields from the open document can be changed in step 820 and the document is updated thereby in step 825.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A computer reuse system for optimizing content, the reuse system comprising:

a processing unit;

a memory coupled to said processing unit;

content stored on said memory, the content comprising a library and a project, said library including folders, items, and definitions, and said project comprising dynamic data, project definitions, and documents;

a display, said display adapted to output the content of said memory and windows;

an input device operable to select editable content in said documents and items in said library; and programming instructions stored on said memory, said programming instructions when executed by said processing unit, operable to control said processing unit to:

output to said display an integrated window including a processing window and a reuse window, wherein the contents of said processing window and said reuse window are concurrently displayed on said display, output to said display, a set of tabs in said reuse window, said set of tabs including a data tab and a library tab, provide a content library view in said reuse window for displaying said items and said folders in said library when said library tab is selected, said content library view configured for accepting editable content selected and moved by said input device from opened documents in said processing window onto said content library view, wherein each item of said items has an user editable item name and contains said reusable content such that said reusable content is identifiable and selectable by said item name, provide a dynamic data view for displaying dynamic data of said project in said reuse window when said data tab is selected, said dynamic data including at least one data field and each data field of said at least one data field including a name field and a value field, transform said editable content into said reusable content contained in said items with said item name for display in said content library view, in response to a first selection and movement by said input device of editable content from said opened documents displayed in said processing window onto said content library view in said reuse window, transform said reusable content contained in an item with a user editable item name into editable content in at least one separate document included in said project, in response to a second selection and movement by said input device of said item from said content library view to a separate document in said at least one separate document displayed in said processing window, integrate said dynamic data into said separate document included in said project such that value fields of said at least one data field in said dynamic data is visible within said separate document, wherein said dynamic data is integrated in response to a third selection and movement by said input device of said at least one data field from said dynamic data view to said separate document displayed in said processing window, and update globally and automatically all said documents in said project that include said dynamic data integrated in said documents, in response to an update of said dynamic data displayed in said dynamic data view of said reuse window.

2. The computer reuse system as in claim 1, said programming instructions, when executed by said processing unit, further operable to control said processing unit to:

provide a content library editor including a content reuse window, an item detail window, and a content preview window, output a library tree including said folder and said items in a hierarchical relationship with said folders to said content reuse window, and output item details of said items to said item detail window, said item details including at least one of: a name, a data created, a date modified, or a comments field.

3. The computer reuse system as in claim 2, said programming instructions, when executed by said processing unit, further operable to transform said editable content into said reusable content by executing said programming instructions to:

create said item in said library in response to said selection and movement of said editable content from said documents to said content library view, wherein said selection and movement is a drag and drop of said editable content from the processing window to said content library view displayed in said reuse window, and store said editable content as said reusable content in said item having said user editable item name.

4. The computer reuse system as in claim 2, said programming instructions, when executed by said processing unit, further operable to:

output said reusable content contained said item to said content preview window, in response to a selection by said input device of said item displayed in said content reuse window and/or said item detail window, and update an item name of said item displayed in said content reuse window, in response to a change of said item name in an editor.

5. The computer reuse system as in claim 1, wherein the integration of said dynamic data further comprises storing a bookmark in memory, wherein said bookmark determines the location of dynamic data linked to a document.

6. The computer reuse system as in claim 5, said programming instructions, when executed by said processing unit, further operable to update one or more dynamic data occurrences in said processing window in response to updates of said dynamic data by said input device in said dynamic data view displayed in said reuse window.

7. The computer reuse system as in claim 5, wherein said bookmark further comprises a unique ID.

8. The computer reuse system as in claim 5, wherein a document in said documents further comprises multiple occurrences of a bookmark.

9. The computer reuse system as in claim 5, wherein a document in said documents further comprises multiple unique bookmarks.

10. The computer reuse system as in claim 1, wherein the processing window contains a text editor, an internet browser, or an e-mail editor.

11. The computer reuse system as in claim 1, said programming instructions, when executed by said processing unit, further operable to:

provide a project explorer including a project reuse window and a project document window, said project explorer configured for creation, addition, deletion, and management of projects, wherein said project including said at least one document in a hierarchical relationship with said project is created in said project explorer.

12. The computer reuse system as in claim 11, said programming instructions, when executed by said processing unit, further operable to:

provide a project tree having a root folder and at least one project in a hierarchical relationship with said root folder and at least one document in said hierarchical relationship with said project, and output said project tree including said project and said at least one document to the project reuse window, wherein said at least one document is in a hierarchical relationship with said project.

13. The computer reuse system as in claim 1, programming instructions, when executed by said processing unit, further operable to control said processing unit to control said display to output a content library tree in said content library view displayed in said reuse window when said library tab is selected, said content library tree having folders with associated items in relation to said definitions.

14. The computer reuse system as in claim 13, programming instructions, when executed by said processing unit, further operable to add, edit, remove folders, and items.

15. The computer reuse system as in claim 1, programming instructions, when executed by said processing unit, further operable to:

provide a field manager including a field reuse window, a field detail window, and a field preview window, output said dynamic data of said project in a field tree to said field reuse window, said field tree including subfolders and data fields in a hierarchical relationship with said subfolders, output field details of said data fields to said field detail window, and output fields of a data field to said field preview window.

16. The computer reuse system as in claim 15, wherein said field details includes at least one of: a name field, a date created, a data modified, or a comment field, and said fields of said data field is outputted to said field preview window, in response to a selection by said input device of said data field displayed in said field reuse window and/or said field detail window.

17. The computer reuse system as in claim 1, programming instructions, when executed by said processing unit, further operable to: output a set of tabs in said processing window, said set of tabs in said processing window including at least one office tab indicating opened documents in said project and a currently selected document for display in said processing window.

18. A method for reusing data, the method comprising the steps of:

providing a reuse system comprising a processing unit, a memory coupled to said processing unit, programming instructions, and content stored on said memory, said content comprising a library and a project, said library including folders, items, and definitions, and said project comprising dynamic data, project definitions, and documents;

outputting, on a display unit, an integrated window including a document editor window and a reuse window, wherein contents of said document editor window and said reuse window are concurrently displayed on said display unit;

outputting, on said display unit, a first set of tabs in said reuse window, and a second set of tabs in said document editor window, said first set of tabs including a data tab and a library tab, said second set of tabs including at least one office tab indicating opened documents in said project and a currently selected document for display in said document editor window;

providing, by said processing unit, a content library view in said reuse window for displaying said items and said folders in said library when said library tab is selected, said content library view configured for accepting editable content selected and moved by said input device from opened documents in said document editor window onto said content library view, wherein each item of said items has an user editable item name and contains reusable content such that said reusable content is identifiable and selectable by said item name;

providing, by said processing unit, a dynamic data view for displaying at least one data field in said reuse window when said data tab is selected, wherein each data field of said at least one data field includes a name field and a value field;

transforming, by said processing unit, said editable content displayed in said document editor window into said reusable content contained in said items with said item name for display in said content library view, in response to a first selection and movement by said input device of said editable content from said opened documents displayed in said document editor window onto said content library view displayed in said reuse window;

transforming, by said processing unit, said reusable content contained in an item with an user editable item name into editable content in at least one separate document included in said project, in response to a selection and movement by said input device of said item from said content library view to a separate document in said at least one separate document displayed in said document editor window;

integrating, by said processing unit, said at least one data field into said separate document included in said project such that value fields of said at least one data field are visible within said separate documents, wherein said dynamic data is integrated in response to a selection and movement by said input device of said at least one data field from said dynamic data view to said separate document displayed in said document editor window; and updating, globally and automatically, by said processing unit, all said documents in said project that include a value field of a data field integrated in said documents, in response to an update of said value field of said data field displayed in said dynamic data view.

19. The method according to claim 18, further including the steps of:
providing, by said processing unit, a project explorer including a project reuse window and a project document window, said project explorer configured for creation, addition, deletion, and management of projects, wherein said project including said documents in a hierarchical relationship with said project is created in said project explorer;

providing, by said processing unit, a project tree having a root folder and at least one project in a hierarchical relationship with said root folder, said at least one project including at least one document in said hierarchical relationship with said project;

outputting said project tree including said project and said documents to said project reuse window;

outputting document details of said documents of said project to said project document window, said document details including at least one of: a display name, a type, a date created, a date modified, an author, or a location; and updating said project by adding documents to said project.

20. The method according to claim 19, further including the steps of:
providing, by said processing unit, a content library editor including a content reuse window, an item detail window, and a content preview window;

outputting a library tree including said folders and said items to said content reuse window, wherein said items are in a hierarchical relationship with said folders;

outputting item details of said items to said item detail window;

outputting reusable content of an item to said content preview window; and updating an item name of said item displayed in said content reuse window, in response to a change in said item name in an editor.

21. The method according to claim 20, wherein said item details including at least one of: a name, a date created, a date modified, or a comments field; and said reusable content of said item is outputted in response to a selection by said input device of said item displayed in said content reuse window and/or said item detail window.

22. The method according to claim 21, further including the steps of:
providing, by said processing unit, a field manager including a field reuse window, a field detail window, and a field preview window, outputting said dynamic data of said project in a field tree to said field reuse window, said field tree including subfolders and data fields, wherein said data fields are in a hierarchical relationship with said subfolders, outputting field details of said data fields to said field detail window; and outputting fields of a data field to said field preview window.

23. The method according to claim 22, wherein said field details including at least one of: a name field, a date created, a date modified, a comment field; and said fields of said data fields is outputted in response to a selection by said input device of said data field displayed in said field reuse window and/or said field detail window.

* * * * *

UNITED STATES PATENT AND TRADEMARK OFFICE
CERTIFICATE OF CORRECTION

| | |
|---|---|
| PATENT NO. | : 8,225,204 B2 |
| APPLICATION NO. | : 12/410737 |
| DATED | : July 17, 2012 |
| INVENTOR(S) | : Kai Kei Cheng |

It is certified that error appears in the above-identified patent and that said Letters Patent is hereby corrected as shown below:

Column 10, Line 42, Claim 16, delete "data" and insert -- date --

Signed and Sealed this
Thirteenth Day of November, 2012

David J. Kappos
*Director of the United States Patent and Trademark Office*